US008638230B2

(12) United States Patent
Li et al.

(10) Patent No.: US 8,638,230 B2
(45) Date of Patent: Jan. 28, 2014

(54) HARDWARE ATTITUDE DETECTION IMPLEMENTATION OF MOBILE DEVICES WITH MEMS MOTION SENSORS

(75) Inventors: Guanfeng Li, Fremont, CA (US); Edward Y. Chang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/479,851

(22) Filed: May 24, 2012

(65) Prior Publication Data
US 2013/0314238 A1  Nov. 28, 2013

(51) Int. Cl.
*G08B 21/00* (2006.01)
(52) U.S. Cl.
USPC ........................ 340/669; 340/691.6; 340/5.32
(58) Field of Classification Search
USPC .................. 340/669, 670, 671–675, 680, 683, 340/686.1, 691.1, 691.6, 692, 825.23, 5.32
See application file for complete search history.

(56) References Cited

U.S. PATENT DOCUMENTS

| | | | |
|---|---|---|---|
| 5,874,942 A | 2/1999 | Walker | |
| 6,636,521 B1 * | 10/2003 | Giulianelli | 370/407 |
| 7,626,499 B2 * | 12/2009 | Burneske et al. | 340/539.13 |
| 7,907,838 B2 * | 3/2011 | Nasiri et al. | 396/55 |
| 2003/0085870 A1 * | 5/2003 | Hinckley | 345/156 |
| 2006/0155818 A1 * | 7/2006 | Odenwald et al. | 709/208 |
| 2008/0158154 A1 * | 7/2008 | Liberty et al. | 345/158 |
| 2009/0088204 A1 * | 4/2009 | Culbert et al. | 455/556.1 |
| 2010/0127968 A1 | 5/2010 | Kramer et al. | |
| 2010/0179758 A1 | 7/2010 | Latif | |
| 2012/0064951 A1 * | 3/2012 | Agevik et al. | 455/569.1 |

FOREIGN PATENT DOCUMENTS

| | | |
|---|---|---|
| WO | 9837484 A1 | 8/1998 |
| WO | 2006016690 A1 | 2/2006 |

OTHER PUBLICATIONS

International Search Report and Written Opinion dated Aug. 2, 2013, PCT Application No. PCT/US2013/042494, filed May 23, 2013, pp. 1-13.

* cited by examiner

*Primary Examiner* — Daniel Previl
(74) *Attorney, Agent, or Firm* — MH2 Technology Law Group, LLP

(57) ABSTRACT

Systems and methods for detecting an attitude of a device are disclosed. The system includes a processing system including at least a sensor processor and an application processor, which are distinct. The system further includes a memory system including one or more computer-readable media. The computer-readable media contains instructions that, if executed by the processing system, cause the system to perform operations. The operations include executing an application using the application processor, and receiving raw sensor readings from one or more sensors, using the sensor processor. The operations also include determining, using the sensor processor, a processed sensor metric comprising attitude data, and transmitting the processed sensor metric to the application.

17 Claims, 3 Drawing Sheets

HARDWARE ATTITUDE DETECTION IMPLEMENTATION OF MOBILE DEVICES WITH MEMS MOTION SENSORS

TECHNICAL FIELD

The present disclosure relates to systems and methods for sensing and monitoring system attitude, e.g., in a mobile device.

BACKGROUND

Mobile devices may be equipped with various sensors, such as an accelerometer, a gyroscope, and a magnetic field sensor, among others. The sensors are often fabricated to be small in size, so as to fit inside the small package provided by the mobile device. The sensors, at least from a functionality standpoint, may be essentially miniaturized versions of larger, more conventional electric and/or electro-mechanical sensors, and may be referred to as, or as part of, micro electro-mechanical systems (MEMS).

Applications executed on the mobile devices may interface with the sensors and obtain sensor data, such as heading, position, and/or angular or linear acceleration, therefrom. During operation, the applications may receive and translate the raw sensor readings to determine the attitude of the mobile device, based on predetermined calibration data or other translation algorithms. Such processed information may be used in the applications for a variety of purposes, for example, to determine a direction in which the device is proceeding (e.g., the direction in which a user carrying the phone is walking), or to input instructions, for example, to move a cursor left or right by tilting the device, or to provide commands, invoke functions, etc. by manipulating the attitude of the device (e.g., by shaking the device).

However, there are shortcomings in current sensor data acquisition techniques, especially when used indoors. The heading of the device indoors may be determined at least partially using magnetic (e.g., compass) information; however, the accuracy of such information is sensitive to ambient magnetic fields, such as those created by nearby electrical current. Such nearby electrical currents are common in indoor use, leading to reduced sensor accuracy.

Another way to determine heading uses the gyroscope and the accelerometer. However, the gyroscopic and/or linear acceleration information may vary quickly, and requires frequent refreshing. Further, to maintain acceptable feedback response times, the polling rate of the sensors is often high. However, the processing resources on the mobile devices are typically scarce when compared to larger computing devices, owing at least partially by reduced size and/or limited power supply. Accordingly, sharing the processor between running the application and providing high-frequency sampling may lead to significant update latency.

Accordingly, present systems suffer from one or more of high update latency, slow response times, and limited accuracy. What is needed, then, are improved systems and methods for detecting attitude in a mobile device.

SUMMARY

Embodiments of the present disclosure may provide a computer-implemented method for detecting an attitude of a device. The method includes executing an application using an application processor, and registering the application as a listener with a sensor processor. The application processor and the sensor processor are distinct. Further, registering includes sending a request including a listener parameter comprising one or more conditions for satisfying a triggering event and a prescribed type of attitude data. The method also includes activating one or more sensors disposed in the device and configured to detect one or more attitude variables, and receiving raw sensor readings from the one or more sensors using the sensor processor. The method further includes determining, using the sensor processor, a processed sensor metric from the raw sensor readings, and determining when the triggering event is satisfied. The method also includes, in response to determining that the triggering event is satisfied, transmitting an event notification to the application.

Embodiments of the present disclosure also provide a computer-readable medium storing a computer program that, when executed by a device, causes the device to perform a sequence of operations. The operations include executing an application using an application processor included in the device, and acquiring raw sensor readings from one or more sensors included in the device, using a sensor processor included in the device. The sensor processor and the application processor are distinct from one another. The operations also include determining, using the sensor processor, a processed sensor metric from the raw sensor readings, and transmitting the processed sensor metric to the application processor executing the application.

Embodiments of the present disclosure may further provide a system. The system includes a processing system including at least a sensor processor and an application processor, with the sensor processor and the application processor being distinct. The system also includes a memory system including one or more computer-readable media. The computer-readable media contain instructions that, if executed by the processing system, cause the system to perform operations. The operations include executing an application using the application processor, and receiving raw sensor readings from one or more sensors, using the sensor processor. The operations further include determining, using the sensor processor, a processed sensor metric comprising attitude data. The operations also include transmitting the processed sensor metric to the application.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
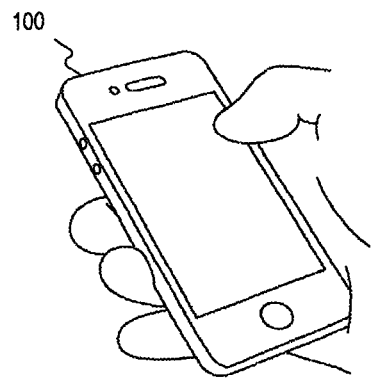
FIG. 1 illustrates a simplified perspective view of a device, according to an embodiment.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 2:
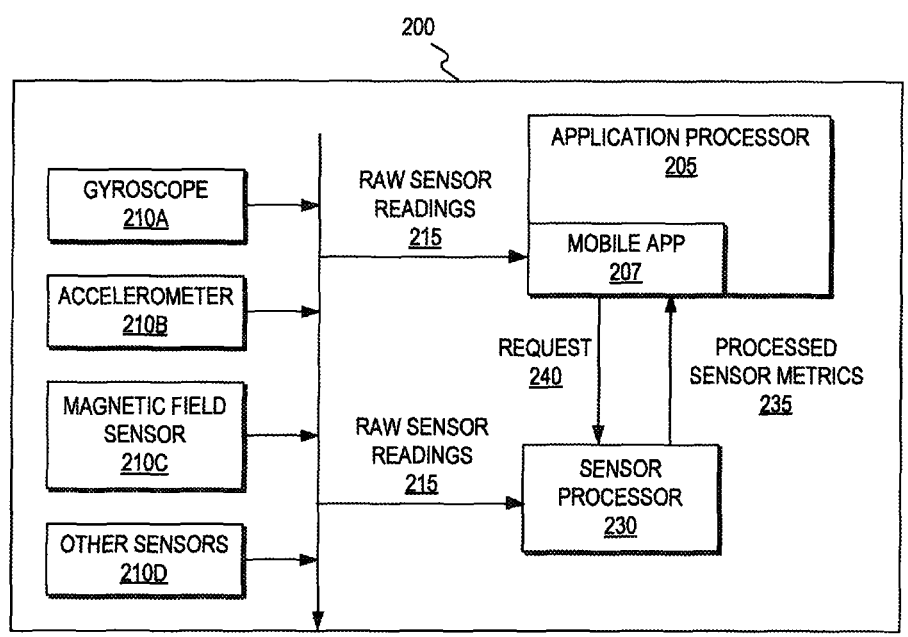
FIG. 2 illustrates a schematic view of a system that may be included in the device, according to an embodiment.

With reference generally to FIGS. 1 and 2, there is illustrated a device 100 and a system 200 that may be implemented in the device 100. The system 200 provides an application processor 205 and a sensor processor 230, which may be functionally, structurally, and/or operationally distinct. The application processor 205 may be configured to execute a mobile application ("mobile app") 207, while the sensor processor 230 may be configured to acquire data indicative of the attitude of the device 100 from one or more attitude sensors 210A-D, as will be described in greater detail below. Further, the sensor processor 230 may process the data acquired from the sensors 210A-D into processed sensor metrics 235, which are readily usable by the mobile app 207. By providing such separate processors 205, 230, the system 200 may be capable of acquiring and processing data from the sensors 210A-D at a relatively high frequency and over time, thereby increasing accuracy of the attitude determination, without increasing latency in the execution of the mobile app 207.

Referring now to the figures in greater detail, FIG. 1 illustrates one example of the device 100, according to an embodiment. As it is used herein, the term "device" may refer to any type of mobile or standalone device, including any combination of hardware and software, capable of supporting the functionalities and data processing techniques as discussed herein. For example, the device may be a mobile phone, a tablet device, a notebook device, a personal data assistant (PDA), or the like.

In at least one embodiment, the device 100 may be configured to be hand-held, as shown, or otherwise free to move or be moved in one or more linear and/or rotational directions. Accordingly, the device 100 may be oriented at a variety of "attitudes." As the term is used herein, "attitude" includes any orientation and/or motion information. For example, attitude may include pitch, roll, yaw, heading, altitude, linear velocity, angular velocity, linear acceleration, angular acceleration, or any other similar variables. The device 100 may include sensors, as will be described below, capable of sensing one or more of such attitude variables, and one or more processors capable of receiving and processing the raw data from the sensors. At the user's request, for example, the device 100 may use such information for a variety of purposes, such as to determine location or direction of the user of the device 100, the velocity or acceleration of the user, or may determine physical inputs entered by the user adjusting (e.g., tilting, shaking, etc.) the attitude of the device 100. Such attitude information may be useful for providing input to and/or tailoring output from a mobile application that the device 100 executes.

FIG. 2 illustrates a schematic view of the system 200, which may be implemented in the device 100 and may be configured to sense and process attitude data. As noted above, the system 200 may include an application processor 205, which may be configured to execute an application, for example, a mobile application (or "mobile app") 207. The mobile app 207 may be or include a set of instructions provided on a computer-readable medium that, when executed by the application processor 205, are configured to cause the system 200 to perform operations, which, among other things, may include acquiring attitude data, as will be described below. The computer-readable medium may be a non-transitory, tangible medium such as memory system, which may include volatile or non-volatile memory (e.g., RAM, flash memory, or a disk), other hardware, combinations thereof, or the like.

The system 200 may include one or more sensors, for example, a gyroscope 210A, an accelerometer 210B, a magnetic field sensor 210C, and one or more other sensors 210D. The gyroscope 210A may be or include one or more on-chip gyrating circuits implemented with micro electro-mechanical systems (MEMS) technology to form a piezoelectric gyroscope, a vibrating wheel gyroscope, a tuning fork gyroscope, a hemispherical resonator gyroscope, or a rotating wheel gyroscope that responds to inertial forces, such as Coriolis acceleration or linear acceleration. The gyroscope 210A may generate motion data in one, two or three axes, for example, voltage readings indicative of such motion data.

Further, the accelerometer 210B may be a single, two, three, or more axis inertial, MEMS, and/or solid state accelerometer or the like. The magnetic field sensor 210C may be configured to determine directional headings, for example, based on traditional cardinal directions. The magnetic field sensor 210C may also be a MEMS sensor or another type of sensor with compass or compass-like functionality. The "other" sensors 210D may include any type of MEMS sensor, pressure or barometric sensors (e.g., for altitude determination), horizon sensors, yaw-rate sensors, GPS receivers, optical sensors, infrared sensors, RF sensors, and/or the like.

Each of the sensors 210A-D may include one or more, for example, an array of sensors. In an embodiment, the gyroscope 210A may include three sensors, each configured to detect rotational motion about a separate axis (e.g., pitch, roll, and yaw). In some embodiments, additional sensors may be included in the depicted gyroscope 210A, for example, to provide additional, e.g., more precise, data and/or for redundancy data checking. Further, in various embodiments, the accelerometer 210B may include three linear sensors, configured to detect motion in three linear axes (e.g., x: left-and-right; y: up-and-down; and z: front-and-back, with reference to the device 100 shown in FIG. 1). Additional sensors may be included in depicted accelerometer 210B so as to provide additional information, greater precision, and/or redundancy-checking in the system 200.

Each of the sensors 210A-D may be configured to provide raw sensor readings 215. The raw sensor readings 215 may be or include vectors, strings, or other types of data structures. The data structures may include, for example, voltages of a magnitude corresponding to a relevant attitude variable. For example, the gyroscope 210A may output one or more signals, e.g., voltages, indicating pitch, roll, yaw, and/or velocities and/or acceleration related thereto, etc. The accelerometer 210B may output one or more signals, e.g., voltages, corresponding to linear acceleration, while the magnetic field sensor 210C outputs signals, e.g., voltages, related to directional orientation. The other sensors 210D may output other raw sensor readings 215.

The system 200 may include a sensor processor 230 configured to receive and translate the raw sensor readings 215. The sensor processor 230 may operate by utilizing one or more algorithms configured to convert gyroscopic, acceleration, magnetic field, and other data into useful attitude data or metrics, referred to herein as "processed sensor metrics" 235. For example, the sensor processor 230 may employ a Kalman filter or any other algorithm configured to translate the raw sensor readings 215 into processed data metrics 235.

Accordingly, the sensor processor 230 may collect the raw sensor readings 215 and translate the readings into data structures or other signals which may be passed to the mobile app 207 as the processed sensor metrics 235. The processed sensor metrics 235 may be fed to the mobile app 207 in response to the mobile app 207 polling for or "pulling" data from the sensor processor 230.

Additionally, the processed sensor metrics 235 may be fed to the mobile app 207 by "pushing" data thereto. For example, the mobile app 207 may supply conditions for satisfying a triggering event to the sensor processor 230. When the triggering event is satisfied, the sensor processor 230 may provide the processed sensor metrics 235 to the mobile app 207, and the mobile app 207 may be waiting, polling, or "listening" for such a processed sensor metric 235 to be received. Such triggering event conditions may be or include the expiration of a time interval, or one or more of the sensors 210A-D taking a reading that indicates an attitude variable has crossed a threshold. Triggering events can also include a sensor 210A-D failure, or any other condition.

The processed sensor metrics 235 may be one or more data structures which may provide sensor status and/or attitude data to the mobile app 207. For example, the processed sensor metrics 235 may include a bit vector indicating whether or not each of the sensors 210A-D is ready, busy, or in error. This may signal to the mobile app 207 whether the device 100 is operational to provide data that may be necessary to support running of the mobile app 207. The processed sensor metrics 235 may also include a 3-tuple (i.e., a data structure with three related elements) representing the pitch, yaw, and/or roll position of the device 100 at a given instant. The processed sensor metrics 235 may also be or include a 4-tuple, providing the magnitude of acceleration and a three-dimensional heading. The processed sensor metrics 235 may further be or include a 4-tuple providing magnitude of velocity and a three-dimensional heading of the device 100. Additionally, the processed sensor metrics 235 may be or include a 4-tuple including the distance and three-dimensional displacement. It will be appreciated that a variety of different data structures, with any number of elements, may be passed as part of the processed sensor metrics 235.

In polling embodiments and/or in pushing embodiments, the mobile app 207 may send one or more requests 240 to the sensor processor 235 for the processed sensor metrics 235. The request 240 may be provided by one or more function calls in the mobile app 207. For example, the request 240 may signal that attitude data is required and may prescribe a type of attitude data and/or a form (e.g., type of data structure) for the processed sensor metrics 235. In some embodiments, the request 240 may omit such a prescription, with, for example, the type of attitude data and/or data structure having already been specified or relevant data being determined by the sensor processor 230. In other embodiments, each request 240 may specify what type of data is requested to be in the processed sensor metrics 235.

Further, the request 240 may sometimes specify the type of data and sometimes not. For example, the request 240 may specify data when the type or form of data requested for inclusion in the processed sensor metrics 235 is to change (e.g., from a positional 3-tuple to a velocity and direction 4-tuple), but otherwise not specify data, with the default being the previously provided data type, or another default. In other embodiments, the request 240 may be provided at initialization and may simply request information from the sensor processor 230 upon a triggering event, as discussed above. In still other embodiments, the request 240 may be omitted.

The sensor processor 230 and the application processor 205 may be provided separately in the device 100, such that the two processors 205, 230 are "distinct." For example, the sensor processor 230 and the application processor 205 may be provided on separate processor chips, which may be communicably linked together. In other embodiments, the two processors 205, 230 may be provided in different cores of a multi-core processor. As the term is used herein, two "distinct" processors are generally two processors that are independently operable, providing separate and/or parallel functionality, such that executing instructions with one of the processors does not, in itself, affect the latency of the other processor. Accordingly, the sensor processor 230 may operate "in the background" with respect to the application 207, such that bandwidth required for the sensor processor 230 does not reduce the bandwidth available for the mobile app 207, in an embodiment.

Operating or otherwise providing the sensor processor 230 separately from the application processor 205, may free the processor to run the mobile app 207 with minimal latency by avoiding burdening the application processor 205 with providing the interpretation functionality of the sensor processor 230. It will be appreciated however, that in some cases, the application processor 205 may be configured to communicate directly with one or more of the sensors 210A-D to receive raw sensor readings 215 therefrom, as shown. This enables a bypass of the sensor processor 230, which may be provided for a variety of reasons, for example, to intermittently check the accuracy of the calibration of the sensor data process 230, if the sensor processor 230 is unavailable or in error, if a brief (e.g., single) check of the sensors 210A-D is desired, or for any other reason.

Communication between the mobile app 207 and the sensor processor 230 may be provided by an application processor interface (API). The API may facilitate, for example, standardize interaction between one or more mobile apps and the sensor processor 230. For example, the API may provide standardized functions and responses, which a variety of mobile apps may reliably employ.

Figure 3:
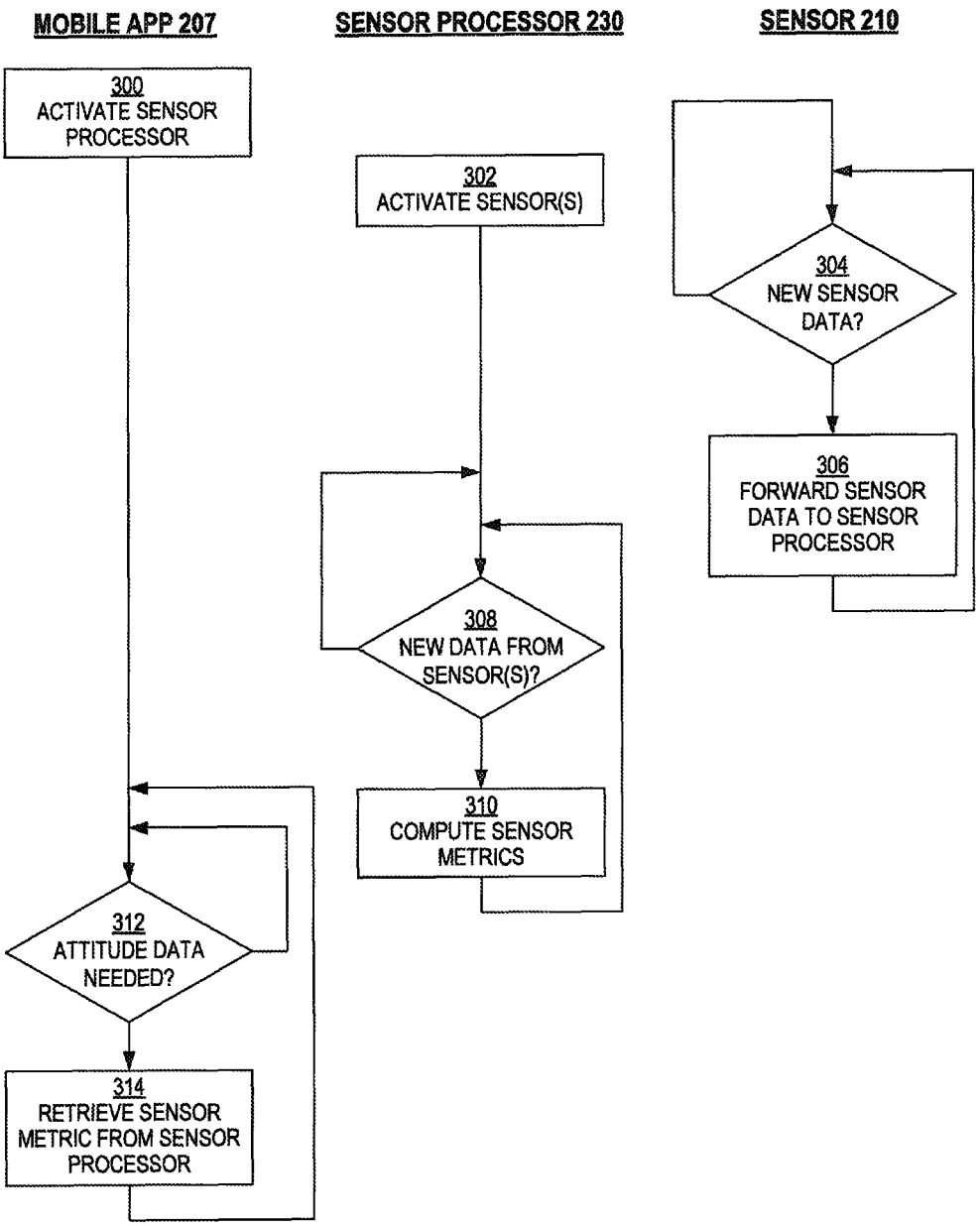
FIG. 3 illustrates a flowchart of a method for detecting an attitude of the device, according to an embodiment.

FIG. 3 illustrates a flowchart of a method for detecting an attitude of the device 100, for example, by operating the system 200, according to an embodiment. Any one or more of the sensors 210A-D depicted in FIG. 2 may be employed in the method; therefore, the sensors 210A-D are simply labeled as 210 in FIG. 3, with it being appreciated that a reference to "sensor(s) 210" can refer to any or all of the sensors 210A-D individually or as a group. Moreover, the embodiment of the method depicted in FIG. 3 may provide for the mobile app 207 pulling data from the sensor processor 230.

The method may include activating the sensor processor 230, as at 300. Activating the sensor processor 230 at 300 may proceed by a function call from the mobile app 207 to the sensor processor 230. The sensor processor 230 may respond by activating the sensor(s) 210, as at 302. Activating the sensor(s) 210 may include providing a signal to a relay and/or a power source to provide power to the sensor(s) 210 or to otherwise initiate monitoring of attitude variables by the sensor(s) 210. The sensor(s) 210 may be generally autonomous in function, and may thus sample attitude variables, as at 304, at a predetermined frequency. In other embodiments, the sensor(s) 210 may sample data at 304 at the command of the sensor processor 230. In either exemplary case, the sampled raw sensor readings 215 may then be forwarded to the sensor processor 230, at 306. The sensor(s) 210 may then return to sampling for sensor data, as at 304. In the case that the sensor(s) 210 is in error or is otherwise not sampling data, the sensor(s) 210 may have no sensor data to forward to the sensor processor 230 at 306 and may thus loop back to sampling data, without forwarding sensor data to the sensor processor 230.

The sensor processor 230 may retrieve raw sensor readings 215, as at 308, forwarded from the sensor(s) 210, as at 306. The sensor processor 230 may be configured to sample data at the same frequency with which it is provided by the sensor(s) 210. In other embodiments, the sensor processor 230 may query the sensor(s) 210 as to whether new data from the sensor(s) 210 is available or present, as at 308. If no data is present at 308, the sensor processor 230 may loop back to again interrogate the sensor(s) 210 again or otherwise again determine whether the sensor(s) 210 has forwarded data at 306. In some embodiments, the sensor processor 230 may retrieve data from the sensor(s) 210 at a lower rate than the sensor(s) 215 are configured to provide the raw sensor readings 215. In such embodiments, the sensor(s) 215 may provide a buffer to store raw sensor readings 215 or may discard raw sensor readings 215 that are not retrieved by the sensor processor 230 before the next new raw sensor reading 215 is provided.

The sensor processor 230 may determine the processed sensor metrics 235, as at 310. In some cases, the sensor(s) 210 may be prone to bias errors depending on a variety of factors, including environment. For example, data from the magnetic field sensor 210C (FIG. 2) may be sensitive to local magnetic fields (e.g., provided by nearby permanent magnets, electrical currents, etc.). To account for such bias, raw sensor readings 215 may be sampled over time, enabling normalization the data against a baseline and/or trend, with the useful attitude data being based on the shifts from the baseline and/or trend. Accordingly, the sensor processor 230, when determining the processed sensor metrics 235 as at 310 may receive a string of raw sensor readings 215 over the course of a time period and calculate, determine, and/or extrapolate more accurate attitude data based a normalization or trend of the data received from the sensor(s) 210.

For example, the sensor processor 230 may receive the attitude data in the raw sensor readings 215 forwarded by the sensor(s) 210 at 306 and store the data in a buffer. The sensor processor 230 may then analyze a desired number of the most recent readings from the sensor(s) 210 by accessing the desired indices of the buffer and provide resultant attitude information to the mobile app 207 in the processed sensor metrics 235. In another embodiment, the sensor processor 230 may determine the attitude data "continuously," for example, receiving each raw sensor readings 215 and calculating an update for the heading, velocity, and/or acceleration, etc., using the new raw sensor readings. It will be appreciated that the term "continuously" is generally defined to mean that with each, every-other, or some other subset of each, new raw sensor readings reading 215, the sensor processor 230 updates the processed sensor metrics 235; however, such "continuously" updated embodiments may include the sensor processor 230 conducting other tasks while waiting for the appropriate new raw sensor readings. Accordingly, the sensor processor 230 may receive a relatively large amount of data forwarded at high frequency from the sensor(s) 210 at 306, which may be available for forwarding to the mobile app 207 either continuously or upon demand.

The mobile app 207 may then determine that attitude data is needed, as at 312. The attitude data may be employed by the mobile app 207 for a variety of purposes, for example, to determine geographical information about the device 100, to determine heading or speed, and/or to input motion-based commands to the mobile app 207. When the mobile app 207 determines that attitude data is needed at 312, the mobile app 207 may proceed to retrieving processed sensor metrics 235 from the sensor processor 230, as at 314. Retrieving the processed sensor metrics 235 at 314 may proceed by sending a request 240 to the sensor processor 230, as described above with reference to FIG. 1. The request 240 may include a specification of what particular processed sensor metrics 235 are needed. In other embodiments, the request 240 may not specify what type of data is needed and, instead, the mobile app 207 may be configured to retrieve all or a default set of data, as described above. Accordingly, the mobile app 207 may retrieve the processed sensor metrics 235 from the sensor processor 230, for example, by requesting the sensor processor 230 analyze its buffer of sensor data over a default or specified time period, or may request the sensor processor 230 provide its updated attitude information, in embodiments in which the sensor processor 230 continuously updates. In some embodiments, it may be irrelevant to the mobile app 207 how the sensor metrics 235 are calculated by the sensor processor 230. However, in other embodiments, the mobile app 207 may be configured to specify to the sensor processor 230 how to calculate the sensor data metrics 235.

Figure 4:
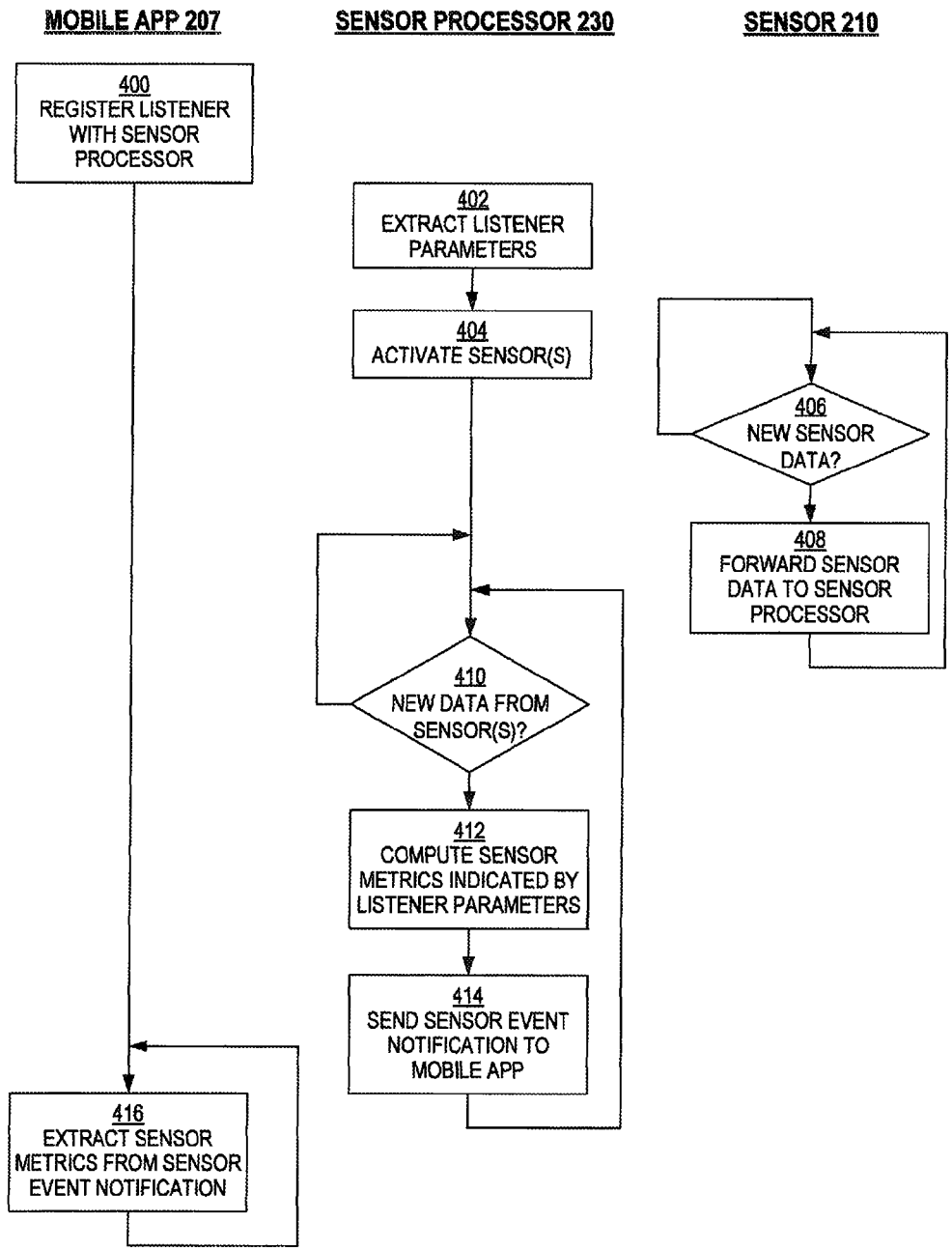
FIG. 4 illustrates a flowchart of another method for detecting an attitude of the device, according to an embodiment.

FIG. 4 illustrates a flowchart of another method for detecting an attitude of the device 100, for example, by operating the system 200, according to an embodiment. More particularly, FIG. 4 may illustrate an embodiment of the method in which data is pushed from the sensor processor 230 to the mobile app 207.

The method may begin by the mobile app 207 registering as a "listener" with the sensor processor 230, as at 400. Registering as a listener at 400 may proceed by the mobile app 207 signaling (e.g., sending a request 240) to the sensor processor 230 that the mobile app 207 requires processed sensor metrics 235. In an embodiment, in response to the mobile app 207 registering as a listener, the sensor processor 230 may extract listener parameters, as at 402. It will be appreciated that the sensor processor 230 may receive requests to register as a listener from several mobile apps, and thus may establish a queue, list, etc., of listeners, each with the same or distinct listener parameters.

Extracting listener parameters at 402 may include receiving and analyzing the request 240, which may provide such parameters. In other embodiments, the sensor processor 230 may further interrogate the mobile app 207 to determine the listener parameters. The listener parameters may include what type of attitude data and in what form (i.e., what data structure) the attitude data is requested for inclusion in the processed sensor metrics 235. The listener parameters may also include conditions for satisfying a triggering event. As noted above, such conditions may include time intervals, sensor readings crossing a threshold, sensor failure, etc.

The sensor processor 230 may then proceed to activating the sensor(s) 210, as at 404. Such activation may include signaling to a relay, or otherwise closing a power circuit with the sensor(s) 210, so as to power the sensor(s) 210. Once activated, the sensor(s) 210 may sample the data at any suitable frequency. Accordingly, the sensor(s) 210 may determine whether new sensor data is available, at 406, and, if it is, forward the sensor data to the sensor processor 230, as at 408.

The sensor processor 230 may interrogate the sensor(s) 210 to determine if new raw sensor readings 215 are available, provoke the taking of readings by the sensor(s) 210, or passively await new raw sensor readings 215 therefrom, as at 410. Once having determined that a new raw sensor reading 215 is available at 410, the sensor processor 230 may receive the new sensor reading 215 and proceed to computing processed sensor metrics 235, for example, those metrics indicated as relevant by the mobile app 207 at 402. As described above, the sensor metrics may be calculated continuously or at intervals by analyzing a buffer.

When the triggering event is detected, the sensor processor 230 may send a sensor event notification to the mobile app 207, as at 414. In response to the sensor sending the event notification at 414, the mobile app 407 may extract processed sensor metrics 235 from the sensor event notification. The mobile app 207 may be listening for such an event notification, or may check for a sensor event notification at a predetermined frequency. Moreover, the sensor event notification may be a flag or bit, indicating that a relevant trigger has occurred, which may signal the mobile app 207 to fetch the processed sensor metrics 235. In another embodiment, the sensor event notification may include data indicative of position, displacement, heading, velocity, acceleration, combinations thereof, or the like, which the mobile app 207 may receive at 416. After receiving the processed sensor metrics, e.g., in the event notification, the mobile app 207 may proceed to listening for the next event notification.

As will be appreciated, the foregoing systems and methods provide for improved attitude sensor data reception and processing, and may reduce update latency often associated therewith. Further, the systems and methods may increase accuracy in the attitude determinations, by allowing the sensor(s) 210 to take readings over time to normalize the readings, reducing inaccuracies caused by externalities such as magnetic fields in the ambient environment. Such sensor reading over time is facilitated by the separate processors 205, 207, allowing the application processor 205 to execute the mobile app 207, while the sensor processor 230 processes the raw sensor readings 215 over time.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, although embodiments have been described in terms of interaction with a user, the above-described techniques are equally applicable to implementations that do not involve human users. Thus, the same techniques may be used to execute programs according to instructions received from another program in computing system 200 or from another computing system altogether. Similarly, commands may be received, executed, and their output returned entirely within the processing and/or memory of computing system 200. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

In the above description and in the below claims, unless specified otherwise, the term "execute" and its variants are to be interpreted as pertaining to any operation of program code or instructions on a device, whether compiled, interpreted, or run using other techniques. Also, in the claims, unless specified otherwise, the term "function" is to be interpreted as synonymous with "method," and may include methods within program code, whether static or dynamic, and whether they return a value or not. The term "function" has been used in the claims solely to avoid ambiguity or conflict with the term "method," the latter of which may be used to indicate the subject matter class of particular claims.

What is claimed is:

1. A computer-implemented method for detecting a metric of a device, comprising:
   executing an application using an application processor;
   registering the application as a listener with a sensor processor, wherein the application processor and the sensor processor are distinct, and wherein registering comprises sending a request including a listener parameter comprising one or more conditions for satisfying a triggering event and a prescribed type of attitude data;
   activating one or more sensors included in the device;
   receiving raw sensor readings from the one or more sensors using the sensor processor;
   determining, using the sensor processor, a processed sensor metric from the raw sensor readings;
   determining when the triggering event is satisfied; and
   in response to determining that the triggering event is satisfied, transmitting an event notification to the application.

2. The method of claim 1, wherein the processed sensor metric is included in the event notification.

3. The method of claim 1, further comprising retrieving, using the application, the processed sensor metric from the sensor processor in response to the event notification.

4. The method of claim 1, wherein the processed sensor metric comprises at least one of a pitch, a yaw, a roll, a velocity, an acceleration, and a displacement.

5. A computer-readable medium storing instructions that, when executed by a device, causes the device to perform a sequence of operations comprising:
   executing an application using an application processor included in the device;
   registering the application as a listener with the sensor processor;
   extracting a listener parameter from the application in response to the application registering as a listener, the listener parameter comprising data indicative of a condition for satisfying a triggering event;
   acquiring raw sensor readings from one or more sensors included in the device, using a sensor processor included in the device, wherein the sensor processor and the application processor are distinct from one another;
   determining, using the sensor processor, a processed sensor metric from the raw sensor readings; and
   transmitting the processed sensor metric to the application processor executing the application.

6. The computer-readable medium of claim 5, wherein the processed sensor metric comprises attitude data.

7. The computer-readable medium of claim 5, wherein the condition for satisfying the triggering event comprises an acceleration or a velocity of the device, or both, being above a predetermined threshold, a time interval, or a combination thereof.

8. The computer-readable medium of claim 5, wherein the listener parameter further comprises a type of attitude data to be included in the processed data metric.

9. The computer-readable medium of claim 5, wherein the operations further comprise:
   determining, using the sensor processor, when the triggering event is satisfied; and
   transmitting an event notification from the sensor processor to the application in response to determining the triggering event is satisfied.

10. The computer-readable medium of claim 9, wherein transmitting the event notification includes transmitting the processed sensor metric to the application.

11. The computer-readable medium of claim 9, wherein the operations further comprise continually listening, using the application, for the event notification.

12. The computer-readable medium of claim 5, further comprising storing the raw sensor readings received by the sensor processor in a buffer, wherein determining the processed sensor metric comprises comparing two or more indices of the buffer.

13. The computer-readable medium of claim 5, wherein determining the processed sensor metric comprises continuously updating at least a portion of the processed sensor metric as the raw sensor readings are received using the sensor processor.

14. A system, comprising:
a processing system comprising at least a sensor processor and an application processor, wherein the sensor processor and the application processor are distinct; and
a memory system comprising one or more computer-readable media, wherein the one or more computer-readable media contain instructions that, if executed by the processing system, cause the system to perform operations comprising:
executing an application using the application processor;
registering the application as a listener with the sensor processor;
extracting a listener parameter from the application in response to the application registering as a listener, the listener parameter comprising a condition for satisfying a triggering event and a type of attitude data to be included in the processed data metric;
receiving raw sensor readings from one or more sensors, using the sensor processor;
determining, using the sensor processor, a processed sensor metric comprising attitude data; and
transmitting the processed sensor metric to the application.

15. The system of claim 14, wherein the operations further comprise:
continually listening, using the application, for an event notification from the sensor processor.

16. The system of claim 15, wherein determining the processed sensor metric comprises continuously updating at least a portion of the processed sensor metric as the raw sensor readings are received.

17. The system of claim 14, wherein the operations further comprise:
determining, using the sensor processor, when the triggering event is satisfied; and
transmitting an event notification from the sensor processor to the application in response to determining the triggering event is satisfied.

* * * * *